United States Patent Office 2,848,300
Patented Aug. 19, 1958

2,848,300

PROCESS OF SEPARATING URANIUM FROM AQUEOUS SOLUTION BY SOLVENT EXTRACTION

James C. Warf, Los Angeles, Calif., assignor to the United States of America as represented by the United States Atomic Energy Commission No Drawing. Application February 6, 1950
Serial No. 142,707

24 Claims. (Cl. 23—14.5)

This invention deals with the separation of uranium values from aqueous solutions and in particular with the separation by means of solvent extraction. The present invention also relates to the extraction of uranium values from an organic solvent solution.

It is an object of this invention to provide a process by which uranium may be recovered from aqueous solutions, especially to a substantially complete degree.

It is another object of this invention to provide a process for the recovery of uranium from aqueous solutions by which the uranium values are obtained in a high degree of purity.

It is another object of this invention to provide a process for purifying uranium values.

It is still another object of this invention to provide a process for separating uranium values from fission product values.

It is finally an object of the present invention to provide a process for separating uranium values from an organic solvent solution.

These and other objects are accomplished by contacting an aqueous solution, preferably a mineral acid aqueous solution, of a uranium salt with a substantially water-immiscible alkyl phosphate whereby the uranium enters the solvent phase, and separating a solvent extract phase and an aqueous phase. The uranium values are extracted from the solvent extract phase by water, preferably by an aqueous solution of a water-soluble carbonate, e. g., ammonium carbonate. Examples of uranium salts in the initial aqueous solution are uranium tetrachloride, uranyl chloride and uranyl nitrate. The preferred salt is uranyl nitrate.

Alkyl phosphates are very stable in the presence of mineral acid solutions and show a preferred solubility for uranium values. Tributyl phosphate, trioctyl phosphate, dioctyl hydrogen phosphate, trihexyl phosphate, dioctyl phenyl phosphonate, didecyl phenyl phosphonate and dihexyl phenyl phosphonate are examples of suitable solvents for the process of this invention. Tributyl phosphate, for instance, admixed with hexane, was not attacked at all when equilibrated for more than two hundred hours with nitric acid solutions ranging from 1 N to 11 N.

The quantity of alkyl phosphate is not critical; however, in the case of tributyl phosphate from 2 to 2.5 moles per one mole of uranium gave the best results.

Some of the alkyl phosphates have a high viscosity and a high specific gravity which make separation of the aqueous phase from the solvent phase difficult. In such cases, it has been found advantageous to dilute the solvent with a less viscous organic material so that separation of the phases is facilitated. For instance, tributyl phosphate is preferably used in diluted form. Diluents suitable for alkyl phosphates are: diethyl ether; diisopropyl ether; dibutyl ether; hydrocarbons, such as hexane, n-heptane, n-octane, the n-alkanes with twelve, thirteen or fourteen carbon atoms, and methylcyclohexane. A diluent, which has been successfully used, is a naphtha having a specific gravity of 0.75, a boiling point of 167°–180° F. and a flash point of 120° F. It is sold under the trade name "Varsol." A mixture of any of the diluents enumerated above may also be used. Particularly good results have been obtained with a mixture of from 15–40%, preferably from 15–25%, tributyl phosphate and hexane. The advantage of a low volatility and thus of a reduced fire hazard is obtained, for instance, with n-heptane or n-octane.

The acidity can be varied widely; for example, an acidity of from 0.1 to 7 N has been found suitable for the mineral acid solution to be treated. Acids preferred are hydrochloric acid and nitric acid, the latter yielding the very best results. In the case of nitric acid, a concentration of from 1 to 7 N, and preferably of from 3 to 7 N, is advantageous. The higher the concentration of the acid, the better the degree of extraction. For instance, in one case, using a mixture of 20% tributyl phosphate and 80% hexane, a distribution factor or coefficient (organic/aqueous) of 0.25 was obtained with an aqueous solution of uranyl nitrate and 0.02 N nitric acid, while under the same conditions a distribution factor of 20.5 was obtained when the nitric acid concentration was 5.46 N.

Another factor which has an improving effect on the distribution of the uranium in favor of the organic solvent is the presence of a salting-out agent. The addition of a separate salting-out agent is not necessary, since the nitric acid or other mineral acid present by itself has a salting-out effect. However, the operation is considerably improved if an additional salt is admixed to the solution. This is shown by two parallel experiments using a mixture of 20% tributyl phosphate and 80% hexane. In one case no salting-out agent was added and a distribution factor of 0.24 was obtained. In the other test sodium nitrate to obtain a concentration of 5N sodium nitrate was added, and a distribution factor of 300 resulted. Salting-out agents found especially advantageous are nitric acid, sydrochloric acid, water-soluble chlorides or nitrates, e. g., sodium nitrate, calcium nitrate, potassium nitrate, strontium nitrate, lithium nitrate, magnesium nitrate, ammonium nitrate, lanthanum nitrate, manganese nitrate, aluminum nitrate or a mixture of such nitrates. The preferred salting-out agent is sodium nitrate in a concentration up to 5 N.

The concentration of uranium salt in the solution can be varied widely. A solution of about 0.4 M for uranyl nitrate has been found to yield especially good results. The equilibrium between organic solvent and aqueous phases is reached in less time than ten seconds when vigorous or adequate contact is provided.

It seems likely, although no conclusive evidence has been found for this assumption as yet, that the extraction of uranium by tributyl phosphate is based on the formation of a complex or compound which involves two moles of solvent, two moles of nitric acid and one mole of uranium, because at this concentration the solvent was found to be saturated with regard to nitric acid and uranium. At this concentration of uranium in the solvent, uranium distribution coefficients were not influenced by changes of acidity in the range of 0.1–5 N, temperature in the range of 10° to 50° C., or salt ($NaNO_3$) concentration in the range of 0–5 M. At concentrations below the saturation point, however, the uranium extraction by tributyl phosphate is improved by an increase of the concentrations of nitric acid and sodium nitrate. Of course, the invention is not limited by this hypothesis of formation of a complex.

In the following, a few examples of the process of this invention are given for the purpose of illustration only, but not for that of limitation.

EXAMPLE I

Thirty ml. of a solution 3 N in nitric acid, 3 N in ammonium nitrate and 0.5 M in uranyl nitrate was shaken with the equal volume of tributyl phosphate. After a few seconds, all yellow color had entered the organic solvent layer showing complete extraction of uranyl salt. The organic layer was separated from the aqueous phase, washed with a nitric acid-ammonium nitrate aqueous solution for further purification of uranium values and then treated with an aqueous solution of ammonium carbonate, whereby the uranium was extracted into the aqueous ammonium carbonate phase.

EXAMPLE II

A solution of uranyl nitrate containing 3 N nitric acid was contacted countercurrently with a mixture of 85% hexane and 15% tributyl phosphate. The organic solvent extract phase was scrubbed with a 3 N nitric acid solution, and then the solvent phase was contacted countercurrently with water for removing uranium values from the solvent. The extraction and re-extraction was carried out in countercurrent batch tubes for three minutes using five extraction stages, four scrub stages and five stages of removing uranium values with water. The flow ratio of organic solvent:feed solution:scrub solution:strip water was 10:3:2:10. Of the uranium originally present in the feed solution 99.9% was found in the water strip and thus had been extracted into the solvent phase and re-extracted by water.

EXAMPLE III

In order to study the effect of the concentrations, a series of experiments was carried out with aqueous solutions containing uranyl nitrate and nitric acid in varying concentrations as indicated in Table I. The uranium-containing solutions were equilibrated in each case with an equal volume of a mixture containing 15% by volume of tributyl phosphate and 85% by volume of hexane by stirring the organic and aqueous liquids for approximately ten minutes. After separation, both phases were sampled and analyzed for uranium to determine the distribution coefficients (organic/aqueous) of uranium values.

*Table I*

| Initial Aqueous Solution Uranyl nitrate, M | Composition $HNO_3$, N | Distribution Coefficient of U |
|---|---|---|
| 0.5 | 8.0 | 0.78 |
| 0.5 | 4.0 | 0.94 |
| 0.5 | 2.0 | 0.76 |
| 0.5 | 1.0 | 0.74 |
| 0.5 | 0.5 | 0.69 |
| 0.5 | 0.0 | 0.46 |
| 0.25 | 8.0 | 2.3 |
| 0.25 | 4.0 | 3.0 |
| 0.25 | 2.0 | 2.1 |
| 0.1 | 8.0 | 5.3 |
| 0.1 | 2.0 | 4.1 |
| 0.1 | 1.0 | 2.1 |
| 0.1 | 0.0 | 0.2 |
| 0.01 | 8.0 | >100 |
| 0.01 | 2.0 | 10 |
| 0.01 | 1.0 | 4 |
| 0.01 | 0.0 | <0.01 |

It will be readily seen from the results given in Table I that even without the use of another salting-out agent a high efficiency is obtained. It is also obvious that extraction by tributyl phosphate is better from dilute uranium salt solutions than from the more enriched ones. With regard to the acidity it seems that a concentration of at least 4 N would yield the most favorable results.

The process of this invention has been found satisfactory, too, for the extraction and separation of uranium from solutions which also contain salts of the rare earth metals, as they are obtained, for instance, in the recovery of uranium and other metals from irradiated slugs used in atomic power piles. In the presence of predominant quantities of uranium, rare earth metal values were found mainly to remain in the aqueous phase, this particularly if the solvent phase approaches the saturation value with regard to uranium. In one extraction experiment with a tributyl phosphate-hexane mixture, the uranium-rare earth separation obtained was greater than $4 \times 10^3$. In another instance, solutions 3 N in nitric acid, from 1 to 3 N in sodium nitrate, and 0.1 M in uranyl nitrate, when extracted with an 85% hexane—15% tributyl phosphate mixture, were found to yield a distribution factor (organic/aqueous) of 0.001 for trivalent cerium and 0.3 for zirconium. The same experiment, except that the tributyl phosphate was saturated with regard to uranium, yielded a distribution factor for zirconium of 0.002. This shows that a better separation is obtained when the organic phase is saturated with uranium salt, the saturated solution, of course, representing the most favorable condition. This creates another advantage of the use of alkyl phosphates in diluted form, since uranium salt saturation is more easily obtained with them than with undiluted alkyl phosphates.

The effect of varying nitric acid and sodium nitrate concentrations was studied; the results are compiled in Table II. For these tests 0.1 M uranyl nitrate solutions, to which tracer amounts of fission product compounds had been added, were extracted with an equal volume of 15% tributyl phosphate—85% hexane mixture.

*Table II*

| $HNO_3$ Concn., N | $NaNO_3$ Concn., N | Distribution Coefficients (organic/aqueous) | |
|---|---|---|---|
| | | Ce (III) | Zr |
| 3.0 | 0 | 0.003 | 0.16 |
| 3.0 | 1.0 | 0.003 | 0.26 |
| 3.0 | 3.0 | 0.003 | 0.61 |
| 3.0 | 4.0 | 0.003 | 0.69 |
| 0.2 | ----- | 0.001 | 0.004 |
| 0.3 | ----- | 0.001 | 0.004 |
| 0.5 | ----- | 0.001 | 0.005 |
| 1.1 | ----- | 0.001 | 0.007 |
| 2.7 | ----- | 0.001 | 0.16 |
| 6.1 | ----- | 0.001 | 0.27 |
| 10.2 | ----- | 0.001 | 0.72 |
| 12.4 | ----- | 0.001 | ----- |
| 16.0 | ----- | ----- | 2.83 |

The results of these experiments show that the extraction of Ce(III) is not affected by concentration changes of either nitric acid or sodium nitrate within the ranges studied, but that a better zirconium separation is obtained at lower concentrations of nitric acid and sodium nitrate.

The process of this invention is applicable to all kinds of solutions from which the uranium is to be recovered. For instance, it has been found suitable par excellence for the recovery of uranium from aqueous solutions of uranium values obtained from monazite sand, pitchblende, carnotite, etc. The process has also been found advantageous for the treatment of uranium metal solutions obtained from power-producing neutronic reactors, where the uranium is to be separated from the fission product values before reuse.

Well-known extraction procedures and apparatus may be used in carrying out the process of this invention. Thus, the extraction steps may be effected by the use of batch, continuous batch, batch countercurrent or continuous countercurrent methods. An especially efficient extraction is obtained by the use of the continuous countercurrent method. In all cases, the ratio of liquid organic solvent to initial aqueous solution may vary widely, e. g., 1:10 to 10:1, and the optimum ratio will depend upon the particular organic solvent and the concentrations used. The organic solvent may be either the dispersed phase or the continuous phase; however, the former is the preferred type.

It will be understood that this invention is not to be limited to the details given herein but that it may be modified within the scope of the appended claims.

What is claimed is:
1. A process for separating uranium values from an aqueous solution containing a uranium salt, comprising contacting said solution with an organic solvent containing tributyl phosphate whereby the uranium enters the solvent phase, and separating a solvent extract phase from an aqueous phase.

2. A process for separating uranium values from an aqueous mineral acid solution containing a uranium salt, comprising contacting said solution with an organic solvent containing tributyl phosphate whereby the uranium enters the solvent phase, and separating a solvent extract phase from an aqueous phase.

3. A process for separating uranium values from an aqueous mineral acid solution containing a uranium salt and from 0.1 to 7 N mineral acid, comprising contacting said solution with an organic solvent containing tributyl phosphate whereby the uranium enters the solvent phase, and separating a solvent extract phase from an aqueous phase.

4. The process of claim 3 wherein the mineral acid is hydrohcloric acid.

5. The process of claim 3 wherein the mineral acid is nitric acid.

6. The process of claim 5 wherein the nitric acid concentration is between 1 and 7 N.

7. The process of claim 6 wherein the nitric acid concentration is between 3 and 7 N.

8. A process for separating uranium values from an aqueous mineral acid solution of uranyl nitrate, comprising contacting said solution with a substantially water-immiscible organic solvent containing tributyl phosphate whereby the uranium enters the solvent phase, and separating a solvent extract phase and an aqueous phase.

9. The process of claim 8 wherein the organic solvent used is a mixture of tributyl phosphate and a substantially water-immiscible organic diluent having a specific gravity of less than 1.

10. The process of claim 9 wherein the diluent is a hydrocarbon.

11. The process of claim 10 wherein the hydrocarbon is a hexane.

12. The process of claim 10 wherein the mixture consists of from 12 to 40% by volume of tributyl phosphate and from 88 to 60% by volume of hexane.

13. The process of claim 11 wherein the mixture consists of from 15 to 25% by volume of tributyl phosphate and from 85 to 75% by volume of hexane.

14. A process for separating uranium values from an aqueous mineral acid solution of a uranium salt and containing a salting-out agent, comprising contacting said solution with an organic solvent containing tributyl phosphate whereby the uranium enters the solvent phase, and separating a solvent extract phase and an aqueous phase.

15. The process of claim 14 wherein the uranium salt is uranyl nitrate, the salting-out agent is sodium nitrate, and the mineral acid is nitric acid.

16. The process of claim 15 wherein the sodium nitrate is present in a concentration up to 5 N.

17. A process for separating uranium values from an aqueous mineral acid solution of a uranium salt, comprising contacting said solution with an organic solvent containing tributyl phosphate whereby the uranium enters the solvent phase, separating a solvent extract phase from the aqueous phase, and back-extracting the uranium values from said solvent phase with an aqueous medium.

18. The process of claim 17 wherein the aqueous medium is water.

19. The process of claim 17 wherein the aqueous medium is a solution of ammonium carbonate.

20. A process for separating uranium values from rare earth metal values, comprising contacting an aqueous mineral acid solution of a uranium salt and a rare earth metal salt with an organic solvent containing tributyl phosphate whereby the uranium preferentially enters the solvent phase while the rare earth metal values predominantly remain in the aqueous phase, and separating a solvent extract phase and an aqueous phase.

21. A process for extracting uranium values from a substantially water-immiscible organic solvent containing tributyl phosphate, comprising contacting said solvent with an aqueous medium whereby said uranium values are taken up by an aqueous phase.

22. The process of claim 21 wherein the aqueous medium is water.

23. The process of claim 21 wherein the aqueous medium is an aqueous solution of water-soluble carbonate.

24. The process of claim 23 wherein the carbonate is ammonium carbonate.

References Cited in the file of this patent

UNITED STATES PATENTS

| | | |
|---|---|---|
| 2,227,833 | Hixson et al. | Jan. 7, 1941 |
| 2,717,696 | Schubert | Sept. 13, 1955 |